Patented Nov. 25, 1952

2,619,484

UNITED STATES PATENT OFFICE 2,619,484

6,7-DIHYDRO-5H-DIBENZ[c,e]AZEPINE AND DERIVATIVES THEREOF

Wilhelm Wenner, Montclair, N. J., assignor to Hoffmann-La Roche Inc., Nutley, N. J., a corporation of New Jersey No Drawing. Application April 21, 1950, Serial No. 157,401

11 Claims. (Cl. 260—239)

This invention relates to new chemical compounds and to processes of making the same. The new compounds may be described broadly as heterocyclic amines and their salts. More particularly, the invention relates to 6,7-dihydro-5H-dibenz[c,e]azepine and derivatives thereof in which the hydrogen attached to the heterocyclic nitrogen atom is replaced by a hydrocarbyl radical, that is, a monovalent hydrocarbon radical, such as an alkyl radical, an alkenyl radical, an aryl radical, a cycloalkyl radical, or an aralkyl radical; or by certain substituted alkyl radicals, viz. a hydroxyalkyl radical or a dialkylaminoalkyl radical. The foregoing compounds are basic, and form salts, which are also included in the invention; e. g., acid addition salts, such as those formed by the bases with inorganic and organic acids, for instance, hydrochloric acid, hydrobromic acid, sulfuric acid, phosphoric acid, acetic acid, tartaric acid, maleic acid, oxalic acid and the like; and quaternary salts, such as those formed by the bases with quaternizing agents, for instance methyl bromide, methyl iodide, methyl sulfate, ethyl bromide, benzyl chloride, methyl-p-toluenesulfonate and the like.

The new compounds are useful in the field of therapeutics. In particular, they have adrenolytic properties and can be used to inhibit or reverse the physiological actions of epinephrine.

The free amines of the invention can be prepared by reacting o,o'-bis-(bromomethyl)-biphenyl with ammonia or with a primary amine such as an alkyl amine, an alkenyl amine, an aryl amine, a cycloalkyl amine, an aralkyl amine, a hydroxyalkyl amine, or a dialkylaminoalkyl amine. The salts of the invention can be prepared by reacting the free amine with the appropriate acid or quaternizing agent. Alternatively, the quaternary salts of the invention can be prepared directly by reacting o,o'-bis-(bromomethyl)-biphenyl with a secondary amine such as a dialkyl amine. 6,7-dihydro-5H-dibenz[c,e]-azepine can also be prepared by catalytic hydrogenolysis of 6-benzyl-6,7-dihydro-5H-dibenz-[c,e]-azepine to effect debenzylation.

The free amines of the invention can be represented by the following general formula

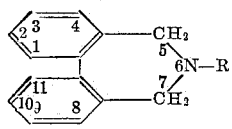

wherein R represents hydrogen, or a monovalent hydrocarbon radical, or a hydroxyalkyl radical, or a dialkylaminoalkyl radical.

The invention is further disclosed in the following examples, which are illustrative of the invention, but not limitative thereof, since equivalents will be obvious to those skilled in the art.

EXAMPLE 1

*6-methyl-6,7-dihydro-5H-dibenz[c,e]azepine*

6.8 g. of o,o'-bis-(bromomethyl)-biphenyl were dissolved in 30 cc. of benzene. 15 g. of a 13 per cent solution of methylamine in benzene were added in a single portion. The mixture warmed up to about 50° C., whereupon a precipitate formed. This was filtered off and the filtrate was washed with water to remove the excess methylamine. Then the filtrate was extracted with dilute hydrochloric acid, and the hydrochloric acid extract was made alkaline with dilute ammonia, precipitating an oil which was extracted with ether. To this ethereal extract was added an ether solution of oxalic acid. A precipitate formed, which was filtered off, and recrystallized from alcohol. The resulting product was identified as 6-methyl-6,7-dihydro-5H-dibenz[c,e]-azepine oxalate, $C_{15}H_{15}N \cdot C_2H_2O_4$, M. P. approximately 175° C.

Another sample of the oil above described was dissolved in ethanol, and an ethanol solution of phosphoric acid was added until the mixture was acid to congo paper. The material which precipitated was separated, recrystallized from alcohol, and identified as 6-methyl-6,7-dihydro-5H-dibenz[c,e]azepine phosphate, $C_{15}H_{15}N \cdot H_3PO_4$, M. P. approximately 187° C. This salt was quite soluble in water.

A solution of the free base 6-methyl-6,7-dihydro-5H-dibenz[c,e]azepine in ether was prepared by dissolving 2 g. of the phosphate salt above described in 20 cc. of water, adding 5 cc. of concentrated ammonia, and extracting the precipitated base with ether. To the ether solution of the base so prepared was added 1 cc. of methyl iodide. After about 5 hours, a crystalline precipitate was filtered off, recrystallized from alcohol, and identified as 6,6-dimethyl-6,7-dihydro-5H-dibenz[c,e]azepinium iodide, M. P. approximately 287°–288° C.

An alternative method of preparing the quaternary salts is illustrated by the following: 5 g. of o,o'-bis-(bromomethyl)-biphenyl were dissolved in 50 cc. of benzene. A solution of 3 g. of dimethylamine in 50 cc. of benzene was added. The mixture warmed up spontaneously to about 45°–50° C. After 20 hours, the precipitate which had separated was filtered off, and the filtrate was distilled to dryness. The crystalline residue was dissolved in water, the aqueous solution extracted with ether, and the aqueous layer was separated and distilled to dryness in vacuo. The residue crystallized in part, and the crystals were filtered off and recrystallized from alcohol, yielding a material identified as 6,6-dimethyl-6,7-dihydro-5H-dibenz[c,e]azepinium bromide, M. P. approximately 260°–262° C.

EXAMPLE 2

*6-ethyl-6,7-dihydro-5H-dibenz[c,e]azepine*

10 g. of o,o'-bis-(bromomethyl)-biphenyl were dissolved in 100 cc. of benzene. 40 g. of a 12 per cent solution of ethylamine in 100 cc. of benzene were added at 20° C. The mixture was allowed to stand for 24 hours and filtered. The filtrate was washed with water and then extracted with dilute hydrochloric acid. The acid extract was made alkaline with concentrated ammonia, and the liberated base was extracted with ether. The ethereal extract was dried, alcoholic hydrobromic acid was added thereto, and the material which precipitated was filtered off, recrystallized from alcohol, and identified as 6-ethyl-6,7-dihydro-5H-dibenz[c,e]azepine hydrobromide, M. P. approximately 203°–204° C.

EXAMPLE 3

*6-n-propyl-6,7-dihydro-5H-dibenz[c,e]azepine*

7 g. of o,o'-bis-(bromomethyl)-biphenyl were dissolved in 50 cc. of benzene. 4 g. of n-propylamine dissolved in 20 cc. of benzene were added. The mixture was allowed to stand at 20°–30° C. for 24 hours and filtered. The filtrate was extracted repeatedly with water, and was then extracted with dilute hydrochloric acid. The base was liberated from the acid extract by addition of ammonia, and was taken up with ether. The ethereal solution was dried over potassium carbonate. To the dried solution was added an alcoholic solution of hydrobromic acid, whereupon a crystalline material separated. This was filtered off, recrystallized from alcohol-ether, and identified as 6-n-propyl-6,7-dihydro-5H-dibenz[c,e]-azepine hydrobromide, M. P. approximately 204°–205° C.

EXAMPLE 4

*6-isopropyl-6,7-dihydro-5H-dibenz[c,e]azepine*

10 g. of o,o'-bis-(bromomethyl)-biphenyl were dissolved in 50 cc. of benzene. A solution of 6 g. of isopropylamine in 50 cc. of benzene was added and the mixture was allowed to stand at room temperature for 48 hours. It was extracted repeatedly with water, then extracted again with dilute hydrochloric acid. The acid extract was made alkaline with dilute sodium hydroxide and the base which separated was taken up with ether. The ethereal solution was dried over anhydrous potassium carbonate, and to the dried solution was added an alcoholic solution of hydrobromic acid. The material which precipitated was filtered off, recrystallized from alcohol and identified as 6-isopropyl-6,7-dihydro-5H-dibenz[c,e]azepine hydrobromide, M. P. approximately 238°–240° C.

EXAMPLE 5

*6-allyl-6,7-dihydro-5H-dibenz[c,e]azepine*

10 g. of o,o'-bis-(bromomethyl)-biphenyl were dissolved in 50 cc. of benzene. A solution of 6 g. of allylamine in 40 cc. of benzene was added. The mixture warmed up a few degrees, and simultaneously it became turbid. After standing for 15 hours at room temperature, it was extracted several times with water to remove allylamine hydrobromide and excess of free allylamine. The benzene was distilled off on the water-bath. The residue was distilled in vacuo. The fraction of B. P. 176°–179° C./12 mm. Hg was 6-allyl-6,7-dihydro-5H-dibenz[c,e]azepine. This base, a viscous oil, was dissolved in alcohol, and a solution of phosphoric acid in alcohol was added until the mixture reacted acid to congo paper. The resulting product, after recrystallization from methanol-ether, melted at approximately 210° C. It was identified as 6-allyl-6,7-dihydro-5H-dibenz[c,e]azepine phosphate, $C_{17}H_{17}N \cdot H_3PO_4$. This salt was very soluble in water.

3 g. of 6-allyl-6,7-dihydro-5H-dibenz[c,e]-azepine base, prepared as described above, were dissolved in 20 cc. of methanol. To this solution 2 cc. of methyl iodide were added. The mixture warmed up slightly, and after about an hour crystals started to form. After 5 hours, the precipitate was filtered off and recrystallized from alcohol, yielding 6-methyl-6-allyl-6,7-dihydro-5H-dibenz[c,e]azepinium iodide, M. P. approximately 182°–184° C.

EXAMPLE 6

*6-n-butyl-6,7-dihydro-5H-dibenz[c,e]azepine*

7 g. of o,o'-bis-(bromomethyl)-biphenyl were dissolved in 30 cc. of benzene. A solution of 5 g. of n-butylamine in 30 cc. of benzene was added. The mixture was warmed for 15 hours to about 50° C. It was then extracted with dilute hydrochloric acid. The acid extract was made alkaline by the addition of an excess of dilute ammonia, precipitating an oil which was extracted with ether. The ether solution was washed with water and dried. An alcoholic solution of hydrobromic acid was added until the mixture reacted acid to congo paper. The resulting precipitate was filtered off and recrystallized from alcohol-ether. The product, 6-n-butyl-6,7-dihydro-5H-dibenz-[c,e]azepine hydrobromide, melted at approximately 163°–164° C.

EXAMPLE 7

*6-cyclohexyl-6,7-dihydro-5H-dibenz[c,e]azepine*

7 g. of o,o'-bis-(bromomethyl)-biphenyl were dissolved in 40 cc. of benzene. A solution of 6 g. of cyclohexylamine in 40 cc. of benzene was added at 25° C. The mixture was kept at 25°–30° C. for 24 hours. The precipitated cyclohexylamine hydrobromide was filtered off, and the filtrate was extracted with dilute hydrochloric acid. From the aqueous acid extract an oil separated immediately. The aqueous layer and the oil were made alkaline with dilute ammonia, and the separated base was extracted with ether. The ether layer was washed with water and dried over potassium carbonate. Upon addition of alcoholic hydrobromic acid, the hydrobromide of 6-cyclohexyl-6,7-dihydro-5H-dibenz[c,e]azepine crystallized immediately. It was recrystallized from 90 per cent alcohol; M. P. approximately 264° C.

EXAMPLE 8

*6-benzyl-6,7-dihydro-5H-dibenz[c,e]azepine*

17 g. of o,o'-bis-(bromomethyl)-biphenyl were dissolved in 100 cc. of benzene. A solution of 17 g. of benzylamine in 100 cc. of benzene was added. The mixture was allowed to stand for 24 hours at 20°–30° C. Benzylamine hydrobromide separated and was filtered off. The filtrate was treated with an excess of 3 per cent hydrochloric acid, and an oil separated in the aqueous layer. It soon solidified and was filtered off, and recrystallized from alcohol, yielding 6-benzyl-6,7-dihydro-5H-dibenz[c,e]azepine hydrochloride, M. P. approximately 205° C.

2 g. of 6-benzyl-6,7-dihydro-5H-dibenz[c,e]azepine base (prepared by cautious neutralization of an aqueous solution of the above hydrochloride, extraction of the precipitated base with ether, and evaporation of the solvent) were dissolved in 20 cc. of ether. 2 cc. of methyl iodide were added, and the mixture was kept at 20°–25° C. for 24 hours. The resulting crystalline product was filtered off, washed with ether, and then recrystallized from acetone-ether, yielding 6-methyl-6-benzyl-6,7-dihydro-5H - dibenz[c,e]azepinium iodide, M. P. approximately 188°–190° C.

EXAMPLE 9

*6-(β-phenylethyl)-6,7-dihydro - 5H - dibenz[c,e]azepine*

17 g. of o,o'-bis-(bromomethyl)-biphenyl were dissolved in 50 cc. of benzene. A solution of 19 g. of β-phenylethylamine in 50 cc. of benzene was added. The mixture was allowed to stand at room temperature for 24 hours; a crystalline precipitate of β-phenylethylamine hydrobromide was then filtered off. The filtrate was freed of benzene on the steam-bath, and the residue was fractionated in vacuo. The fraction of B. P. 250°–255° C./0.1 mm. Hg was 6-(β-phenylethyl)-6,7-dihydro-5H-dibenz[c,e]azepine. The hydrochloride, prepared by addition of alcoholic hydrochloric acid to an alcoholic solution of the base, melted at approximately 221° C.

EXAMPLE 10

*6-phenyl-6,7-dihydro-5H-dibenz[c,e]azepine*

3.4 g. of o,o'-bis-(bromomethyl)-biphenyl were dissolved in 50 cc. of benzene. A solution of 3 g. of aniline in 50 cc. of benzene was added. The mixture was allowed to stand for 48 hours at 25°–30° C. The resulting crystals of aniline hydrobromide were filtered off, and the filtrate was distilled to dryness. The residue was extracted thoroughly with petroleum-ether. The petroleum-ether solution was in turn extracted with 20 per cent hydrochloric acid. The acid extract was neutralized with ammonia and was then extracted with ether. The ether solution was washed and dried over potassium carbonate. Alcoholic hydrobromic acid was added, precipitating a gummy material. The latter was filtered off, the filtrate distilled to dryness, and the residue crystallized from absolute alcohol, yielding 6-phenyl-6,7-dihydro-5H-dibenz[c,e]azepine hydrobromide, M. P. approximately 230°–232° C.

EXAMPLE 11

*6-(β-hydroxyethyl)-6,7-dihydro-5H - dibenz[c,e]azepine*

3.4 g. of o,o'-bis-(bromomethyl)-biphenyl were dissolved in 50 cc. of benzene. A solution of 2 g. of β-aminoethanol in 20 cc. of alcohol was added. The mixture was allowed to stand for 48 hours. It was extracted with water, and the benzene layer was then extracted with dilute hydrochloric acid. From the acid extract the base was liberated with ammonia and was taken up in ether. The ether extract was washed with water and dried over potassium carbonate. The ether was evaporated, and the residue was dissolved in about 20 cc. of alcohol. An alcoholic solution of phosphoric acid was added until the mixture was acid to congo paper. The resulting precipitate was 6 - (β-hydroxyethyl)-6,7-dihydro-5H-dibenz[c,e]azepine phosphate, $C_{16}H_{17}NO \cdot H_3PO_4$, M. P. approximately 179°–181° C.

EXAMPLE 12

*6-(β-diethylaminoethyl)-6,7-dihydro-5H - dibenz[c,e]azepine*

7 g. of o,o'-bis-(bromomethyl)-biphenyl were dissolved in 40 cc. of benzene. A solution of 3 g. of β-diethylaminoethylamine in 40 cc. of benzene was added. The mixture was allowed to stand for 48 hours. It was extracted with water. The benzene layer was then extracted with dilute hydrochloric acid. The acid extract was made alkaline with an excess of sodium hydroxide solution, and the liberated base was extracted with ether. Alcoholic phosphoric acid was added to the ethereal extract, precipitating a crystalline phosphate. The latter was dissolved in hot water, the solution was filtered, and acetone was added to the filtrate. The diphosphate of 6-(β-diethylaminoethyl)-6,7 - dihydro - 5H - dibenz[c,e]azepine, $C_{20}H_{26}N_2 \cdot 2H_3PO_4$, crystallized. It melted at approximately 233°–234° C.

EXAMPLE 13

*6,7-dihydro-5H-dibenz[c,e]azepine*

1.609 g. of 6-benzyl-6,7-dihydro-5H-dibenz[c,e]azepine hydrochloride, prepared according to Example 9, were dissolved in 165 cc. of alcohol and hydrogenated in the presence of 500 mg. of palladium charcoal catalyst, containing 10 per cent palladium, at 25°–30° C. and under a hydrogen pressure of about 1.1 atmospheres. After 6 hours the hydrogen uptake had ceased. The catalyst was removed by filtration, and the alcoholic solution was distilled to dryness. The residue was recrystallized from absolute alcohol, yielding 6,7-dihydro-5H-dibenz[c,e] azepine hydrochloride, M. P. approximately 284°–286° C.

I claim:

1. A compound selected from the group consisting of 6,7-dihydro-5H-dibenz[c,e]azepine, its substitution products wherein the sole substituent is a monovalent non-acetylenic hydrocarbon radical having not more than eight carbon atoms in the 6 - position, 6 - hydroxyalkyl-6,7-dihydro-5H-dibenz[c,e] azepine, 6-dialkylaminoalkyl-6,7-dihydro-5H-dibenz[c,e] azepine, and salts thereof.

2. A substituted 6,7-dihydro-5H-dibenz[c,e]azepine wherein the sole substituent is a monovalent non-acetylenic hydrocarbon radical having not more than eight carbon atoms in the 6-position.

3. A salt of a compound according to claim 2.

4. 6 - lower alkyl - 6,7-dihydro-5H-dibenz[c,e]azepine.

5. A salt of a compound according to claim 4.

6. 6-lower alkenyl-6,7-dihydro-5H-dibenz[c,e]azepine.

7. A salt of a compound according to claim 6.

8. A salt of 6,7-dihydro-5H-dibenz[c,e] azepine.

9. 6-allyl-6,7-dihydro-5H-dibenz[c,e]azepine.

10. A salt of the compound of claim 9.

11. 6-allyl-6,7 - dihydro - 5H - dibenz[c,e]azepine phosphate.

WILHELM WENNER.

REFERENCES CITED

The following references are of record in the file of this patent:

Karrman et al.: Chem. Abs., vol. 43 (1949), p. 3815h.

Paden et al.: J. Amer. Chem. Soc., vol. 58 (1936), p. 2487–2494.

Graebe et al.: Liebig's Annalen, vol. 247 (1888), p. 270.

Hackh's "Chemical Dictionary," The Blackiston Co., Phila., Pa., 3rd ed., p. 170.